(12) United States Patent
Medina, Jr. et al.

(10) Patent No.: US 12,496,299 B2
(45) Date of Patent: Dec. 16, 2025

(54) OPHTHALMIC FORMULATIONS FOR THE TREATMENT OF PRESBYOPIA

(71) Applicant: RESTORE VISION, LLC., Lakewood Ranch, FL (US)

(72) Inventors: Arthur A. Medina, Jr., San Antonio, TX (US); Sharron Acosta, Shavano Park, TX (US); Joseph Terrence Kavanagh, The Woodlands, TX (US); Melissa Kleman, The Woodlands, TX (US)

(73) Assignee: RESTORE VISION, LLC, Lake Ranch, FL (US)

( * ) Notice: Subject to any disclaimer, the term of this patent is extended or adjusted under 35 U.S.C. 154(b) by 0 days.

(21) Appl. No.: 17/530,972

(22) Filed: Nov. 19, 2021

(65) Prior Publication Data

US 2022/0071994 A1   Mar. 10, 2022

Related U.S. Application Data

(63) Continuation of application No. PCT/US2020/063311, filed on Dec. 4, 2020.

(60) Provisional application No. 63/000,652, filed on Mar. 27, 2020, provisional application No. 62/943,400, filed on Dec. 4, 2019.

(51) Int. Cl.
| | |
|---|---|
| *A61K 31/498* | (2006.01) |
| *A61K 9/00* | (2006.01) |
| *A61K 9/107* | (2006.01) |
| *A61K 9/51* | (2006.01) |
| *A61K 31/4178* | (2006.01) |
| *A61K 47/02* | (2006.01) |
| *A61K 47/10* | (2017.01) |
| *A61K 47/24* | (2006.01) |
| *A61K 47/32* | (2006.01) |

(52) U.S. Cl.
CPC ............ *A61K 31/498* (2013.01); *A61K 9/107* (2013.01); *A61K 9/513* (2013.01); *A61K 31/4178* (2013.01); *A61K 47/02* (2013.01); *A61K 47/10* (2013.01); *A61K 47/24* (2013.01); *A61K 47/32* (2013.01)

(58) Field of Classification Search
None
See application file for complete search history.

(56) References Cited

U.S. PATENT DOCUMENTS

| | | | | |
|---|---|---|---|---|
| 8,299,079 | B2 * | 10/2012 | Kaufman | A61K 31/498 |
| | | | | 514/249 |
| 2008/0181867 | A1 * | 7/2008 | Lambert | A61P 27/02 |
| | | | | 424/85.4 |
| 2008/0268020 | A1 | 10/2008 | Philips et al. | |
| 2011/0152274 | A1 * | 6/2011 | Kaufman | A61K 31/498 |
| | | | | 514/249 |
| 2012/0328687 | A1 * | 12/2012 | Horn | A61K 31/498 |
| | | | | 514/249 |
| 2017/0266200 | A1 * | 9/2017 | Sheetrit | A61K 9/0051 |
| 2018/0256509 | A1 | 9/2018 | Friedman et al. | |
| 2018/0271782 | A1 | 9/2018 | Popov et al. | |
| 2019/0038609 | A1 * | 2/2019 | Horn | A61K 47/10 |

FOREIGN PATENT DOCUMENTS

| | | |
|---|---|---|
| WO | 2010/123547 A1 | 10/2010 |
| WO | 2013/169538 A1 | 11/2013 |
| WO | 2015/195458 A1 | 6/2015 |
| WO | 2016/094189 A1 | 6/2016 |
| WO | 2019/097318 A1 | 5/2019 |

OTHER PUBLICATIONS

Yim et al., "The effects of nonporous silica nanoparticles on cultured human keratocytes", IOVS, Jan. 2017, vol. 58, No. 1, pp. 363. (Year: 2017).*

Chen et al., "Effect of brimonidine 0.15% versus pilocarpine 2% on angle configuration and miosis in eyes with angle closure", Arvo annual meeting abstract, Sep. 2016, pp. 1-4 (Year: 2018).*

NIH—ClinicalTrials.gov. ([retrieved from on-line website: https://clinicaltrials.gov/study/NCT03825081?cond=pilocarpine%20and%20brimonidine&rank=2, Jan. 31, 2019 published, pp. 1-7]) (Year: 2019).*

International Search Report (PCT/ISA/210) and Written Opinion (PCT/ISA/237) mailed on Apr. 7, 2021, by the U.S. Patent and Trademark Office as the International Searching Authority for International Application No. PCT/US2020/063311.

Benozzi, Jorge , et al., "Presbyopia: a new potential pharmacological treatment", Medical Hypothesis, Discovery & Innovation Ophthalmology Journal, 2012, vol. 1, No. 1, pp. 3-5.

Extended European Search Report issued on Mar. 26, 2024 by the European Patent Office in corresponding European Patent Application No. 20897454.3 (10 pgs).

Benozzi et al., "Presbyopia: a New Potential Pharmacological Treatment", Medical Hypothesis, Discovery & Innovation (MEHDI) Ophthalmology Journal, vol. 1, No. 1, Jan. 2012 (3 pgs).

(Continued)

*Primary Examiner* — Kyung S Chang
(74) *Attorney, Agent, or Firm* — BUCHANAN INGERSOLL & ROONEY PC

(57) ABSTRACT

The disclosure relates to a pharmaceutical formulation comprising a nanoparticle composition that provides controlled delivery of one or a combination of therapeutic agents. Additionally, the disclosure relates to a pharmaceutical formulation comprising a plurality of coated nanoparticles, wherein the coated nanoparticle comprises a core particle comprising a solid pharmaceutical agent or salt thereof. The disclosure further relates to methods of treating one or more ophthalmic conditions or diseases comprising administering a therapeutically effective amount of a disclosed pharmaceutical formulation.

5 Claims, No Drawings

(56) References Cited

OTHER PUBLICATIONS

Bowen, "Particle size Distribution Measurement from Millimeters to Nanometers and from Rods to Platelets", Journal of Dispersion Science and Technology, vol. 23, No. 5, Jan. 2002, pp. 631-662.

* cited by examiner

OPHTHALMIC FORMULATIONS FOR THE TREATMENT OF PRESBYOPIA

CROSS-REFERENCE TO RELATED APPLICATIONS

This international application claims priority to U.S. Provisional Patent Application No. 62/943,400, filed on Dec. 4, 2019, and U.S. Provisional Patent Application No. 63/000,652, filed on Mar. 27, 2020, the entire content of each of which is incorporated herein by reference.

FIELD

The disclosure relates to a pharmaceutical formulation comprising a nanoparticle composition that provides controlled delivery of one or a combination of therapeutic agents. Additionally, the disclosure relates to a pharmaceutical formulation comprising a plurality of coated nanoparticles, wherein the coated nanoparticle comprises a core particle comprising a solid pharmaceutical agent or salt thereof. The disclosure further relates to methods of treating one or more ophthalmic conditions or diseases comprising administering a therapeutically effective amount of a disclosed pharmaceutical formulation.

BACKGROUND

Presbyopia is an age related change in vision resulting in farsightedness. This common refractive disorder, mainly found in people over the age 40, has a 25% prevalence in the world population. Typical treatments revolve around the use of corrective lenses to fix the problem; however, in countries with poor access to health care, glasses, contacts and replacement lenses can be prohibitively expensive thus driving the need for better alternatives. Further, increasing average age in Western countries will drive the need and desire for inexpensive and minimally invasive treatments for common age related disorders such as presbyopia.

When the eye focuses an image, the tissues of the eye must change shape, and in doing so they work together to focus light to a point that falls on the retina. The cause of presbyopia is a loss of elasticity in the lens of the eye due to cumulative UV exposure and age-related damage. The inelastic nature of an aged eye impairs its ability to change shape and causes the incoming light to be focused to a point behind the retina, resulting in a defocused image. Common symptoms are similar to those seen in other refractive disorders and include headache, double or hazy vision, difficulty focusing, seeing a glare around bright lights, eye strain and squinting. While none of these symptoms are fatal they do contribute to a decrease in productivity and quality of life for those affected.

The novel formulations herein for the treatment of presbyopia revolve around combining drugs in easy to administer ophthalmic formulations. The intent of these new formulations is to improve elasticity of the lens. A shelf-stable, over-the-counter formulation to treat presbyopia would greatly increase access to treatment of the disorder.

Conventional aqueous ophthalmic solutions are generally limited to water-soluble molecules and by the fact that within two minutes after instillation greater than 80% of the administered composition is eliminated via the nasolacrimal drainage system, thereby limiting ocular penetration of active ingredients to less than 1% of the administered dosage. Compositions described herein, however, achieve surprisingly superior bioavailability and retention on the ocular surface.

SUMMARY

Described herein are embodiments of a pharmaceutical formulation comprising a nanoparticle composition that provides controlled delivery of one or a combination of therapeutic agents comprising the agent or agents encapsulated in a matrix comprising chitosan, polyethylene glycol (PEG) and/or polyvinyl alcohol (PVA), and tetra-methoxy-ortho-silicate (TMOS) or tetra-ethoxy-ortho-silicate (TEOS).

Additionally described herein are embodiments of a pharmaceutical formulation comprising a cationic emulsion comprising one or a combination of therapeutic agents. Furthermore, described herein are embodiments of methods for the treatment of one or more ophthalmic conditions or diseases comprising administering a therapeutically effective amount of one or more pharmaceutical formulations described herein.

DESCRIPTION OF THE INVENTION

The proposed formulations for the treatment of presbyopia include those combining brimonidine and pilocarpine for ocular delivery and are set forth herein. These formulations resolve issues associated with rapid clearance of ocular pharmaceuticals from the eye due to blinking. They also resolve issues associated with ocular pharmaceuticals being washed away before having the ability to penetrate the surface of the eye.

It has been estimated that only 5% of a typical Active Ingredient is delivered to the eye in drops. A solution to improve this efficiency is using a delivery system whereupon the drug is delivered as nanoparticles encapsulated and kept in suspension, or whereupon the composition is formulated as a cationic emulsion, such as a cationic nanoemulsion.

Upon application of an eye drop containing the suspended mucoadhesive nanoparticles, the nanoparticles will adhere to the ocular surface by multiple mechanisms preventing their clearance by blinking.

Alternatively, upon application of an eye drop containing a cationic emulsion such as a cationic nanoemulsion described herein, the active ingredient will adhere to the ocular surface by multiple mechanisms preventing their clearance by blinking.

In one embodiment, the nanoparticles are made of chemically inert silica, having a diameter of less than 300 microns, and of sufficiently low concentration that they do not interfere with normal vision and eye health. In another embodiment, the particles may be modified or contain further compounds to improve their mucoadhesive properties. For example, charged polymers will allow for hydrogen or electrostatic binding to mucins on tear film (mucoadhesion), thiolated polymers will allow for covalent binding to mucins at the ocular surface, polymers of a particular size may contribute to blockage of efflux proteins and channels in the cornea, or polymers may affect encapsulation and rate of release of drug or prodrug by nanoparticles. The safety and efficacy of such mucoadhesive nanoparticle delivery systems has been tested and used in vivo for delivery of steroid formulations previously. Once adhered to the surface of the eye, the nanoparticles will diffuse the active ingredient allowing it to cross the corneal barrier.

Also described herein are cationic emulsions, such as cationic nanoemulsions, comprising at least one active ingredient and formulated for treatment of one or more ophthalmic diseases.

Also described herein are methods of treating one or more ophthalmic diseases comprising topically administering a cationic emulsion comprising at least one active ingredient to a patient's cornea or conjunctiva. In certain embodiments, compositions described herein are formulated for treatment of presbyopia.

Cationic emulsions described herein achieve improved ocular surface wettability. For example, in certain embodiments, cationic emulsions described herein provide improved spreading coefficients on a patient's cornea and conjunctiva as compared to conventional eye drops and anionic emulsions. In an aspect, superior topical delivery of ophthalmic active ingredients can be achieved via administration of cationic emulsions described herein to a subject's cornea or conjunctiva.

In an additional aspect, cationic emulsions described herein exhibit prolonged residence time on the ocular surface due to the electrostatic attraction between the positively charged lipid nanodroplets and the negatively charged ocular surface. This interaction results in an augmentation of the tear film layers by the oily and aqueous phase. Thus, cationic emulsions described herein confer an inherently beneficial effect to subjects, irrespective of an active ingredient. In certain embodiments, a superadditive (e.g., synergistic) therapeutic effect is achieved in formulating compositions described herein as cationic emulsions, e.g. cationic nanoemulsions.

In an additional aspect, certain formulations of cationic emulsions described herein can achieve or exhibit improved tear break-up time relative to hyaluronate-based formulations, e.g. hyaluronate artificial tears. In a further aspect, certain formulations of cationic emulsions described herein can achieve or exhibit superior alleviation of lid margin inflammation relative to hyaluronate-based formulations, e.g. hyaluronate artificial tears.

In certain embodiments, cationic emulsions described herein may be prepared with our without the addition of one or more preservatives. In other embodiments, cationic emulsions described herein are substantially free of preservatives. In still other embodiments, cationic emulsions described herein are free of preservatives.

Cationic emulsions described herein may additionally contain one or more pharmaceutically acceptable emulsifiers.

In an aspect, cationic emulsions described herein may be prepared by known, conventional methods.

In certain embodiments, a cationic emulsion described herein comprises medium chain triglyceride and/or without limitation one or more other pharmaceutically acceptable lipids/oils. Examples include, without limitation, sesame oil, castor oil, soya oil, paraffin oil, paraffin light, lanolin, petroleum jelly products (e.g., Vaseline), corn oil, glycerin monostearate, and medium chain monoglycerides.

In certain embodiments, a cationic emulsion described herein comprises, as a cationic agent, cetalkonium chloride. In other embodiments, a cationic emulsion described herein comprises, as a cationic agent, benzalkonium chloride.

In certain embodiments, a cationic emulsion described herein comprises one or more emulsifiers. Examples include, without limitation, phospholipids [Lipoid], polysorbate 80 (i.e., Tween 80), solubilizers and/or emulsifiers (e.g., Cremophor RH), poloxamer 407, poloxamer 188, surfactants (e.g., Miranol C2M provided by Solvay), and tyloxapol. In an aspect, the above-mentioned emulsifiers are tolerated well in embodiments of the cationic emulsion described herein.

The embodiments of this invention will increase ocular drug delivery from 5% to 50% as well as intervals therein allowing for the dosage of active ingredients to be as low as one tenth the strength of formulations that do not make use of nanoparticle technology. In addition, efficacy will be retained at the same time while administering the active ingredients.

In addition, embodiments of the present invention will provide extended release of active ingredient over time. Such extended release formulations may be administered one to six times daily representing a decrease in the frequency of administration of the active ingredient in a formulation without the nanoparticles.

Embodiments of the present invention will contain low dose brimonidine and pilocarpine. All of these active pharmaceutical ingredients may be present in a salt form, crystalline form, polymorphic form or amorphous crystalline form. In addition, the proposed formulation may be thiolated to increase corneal residence time. The proposed active ingredients have basic groups with pKa in the range of 6.5-7.5. The dosage strengths of brimonidine will range from 50 μg/mL to 500 μg/mL with a preferred embodiment being 125 μg/mL. The brimonidine dosage strengths will also be delivered in 0.005% (wt/vol) amounts to 0.05% (wt/vol) amounts where weight refers only to the mass of drug suspended in the formulation. The dosage strengths of pilocarpine will range from 1000 μg/mL to 60000 μg/mL with a preferred strength being 5000 μg/mL. These dosage strengths of pilocarpine will also be delivered in 0.1% (wt/vol) amounts to 6% (wt/vol) amounts where weight refers only to the mass of drug suspended in the formulation. Embodiments of the invention may further include anti-inflammatory agents such as bromfenac, ketorolac, nepafenac, cyclosporine, lifitigrast, flurbiprofen, as well as others.

Additional components of the proposed formulation will include: glycerin, Hypromellose, PEG 400, and benzalkonium chloride. Additional formulation components for the proposed formulation include viscogens such as carboxymethylcellulose, glycerin, polyvinylpyrrolidine and polyethylene glycol; stabilizers such as nonionic surfactants and cyclodextrine; and, preservatives such as benzalkonium chloride, EDTA, sofzia (boric acid, propylene glycol, d-sorbitol, and zinc chloride), and purite (stabilized oxychloro complex). Further modifications to the delivery system can be made via coating with mucoadhesive polymers comprising one or more of polyethylene glycol (PEG), chitosan and hyaluronic acid, and by dispersing nanoparticles in stimuli-responsive hydrogel. For example, pH-, thermo-, and ion-sensitive hydrogels.

Further additional components include one or more pharmaceutically acceptable excipients. Suitable excipients include, but are not limited to one or more osmotic agents, oils, cationic agents, surfactants, buffers, salts, anions, viscosifying agents, preservatives, and/or water. For example, suitable osmotic agents include but are not limited to mannitol, glycerol, sorbitol, propylene glycol, and/or dextrose. Suitable oils include but are not limited to medium chain triglycerides, mineral oil(s), and/or vegetal oil(s) such as castor oil. Suitable surfactants include but are not limited to polysorbates, cremophors, poloxamers, tyloxapol, and/or vitamin E-TPGS. Preferably, compositions described herein do not include buffers, salts or anions. Preferably, in embodiments comprising one or more viscosifying agents, said viscosifying agents are neutral. Preferably, in embodiments comprising one or more preservatives, said preservatives are nonionic and hydrophilic.

Embodiments of the invention will be delivered in a therapeutically effective dose via one or more of the following methods comprising cationic emulsions (e.g. nanoemulsions), microemulsions, nanosuspensions, liposomes, dendrimers, niosomes and discomes, cubosomes, nanomicelles, polyion complex nanomicelles, nanoparticles or solid-lipid-nanoparticles (SLN). Nanoemulsions and microemulsions comprise a water-in-oil solution, a hydrophobic solution suspended in an aqueous solution, optionally containing surfactants and co-surfactants to aid in drug delivery. Nanosuspensions comprise particles less than 1000 nM in size that have poor aqueous solubility and are stabilized by surfactants, polymers or inert resins. Liposomes may comprise a positive charge and one or more phospholipid bilayers forming either a hydrophobic compartment, a hydrophilic compartment or both. Dendrimers may comprise poly acrylic acid or polyamidoamine functionalized with one or more of amines, carboxylic acids, hydroxyl groups or polyethylene glycol. Niosomes comprise bilayered vesicles comprising amphiphilic nonionic surfactants that are non-immunogenic, chemically stable with a particle size between 10 and 1000 nm, and capable of containing and delivering both hydrophobic and hydrophilic drugs. For example, niosomes may comprise timolol maleate and may comprise a coating of chitosan and carbopol. Discosomes comprise niosomes and additional nonionic surfactants with a particle size between 12-16 mm. Cubosomes comprise self-assembled liquid crystalline particles or nanoparticles. Nanomicelles comprise a colloidal solution with a size ranging from 5-200 nM. They comprise anionic, cationic, zwitterionic or nonionic surfactants such as sodium dodecyl sulfate, dodecyltrimethyl ammonium bromide, dioctanoyl phosphatidylcholine, dodecyl tetra ethylene oxide, vitamin E TPGS or octoxynol-40. Nanomicelles may be one or more shapes being spherical, cylindrical or star shaped. Nanomicelles may also be formed comprising a diblock or triblock copolymer where at least one polymer block faces the solution and the other interacts with the drug at the center of the micelle. Polymers of nanomicelles comprise at least two of the following polyethylene glycol, polyethylene oxide, poly (d, l-lactic acid), polypropylene oxide, polyamino acids, such as polyaspartic acid, polyglutamine acid, poly-l-lysine, poly-histidine, ketorolac and copolymers such as N-isopropyl acrylamide (NIPAAM), vinyl pyrrolidone (VP), acrylic acid (AA) cross-linked with N,N'-methylene bis-acrylamide (MBA), methoxy poly(ethylene glycol), hexylsubstituted poly(lactides) (MPEGhexPLA), Pluronic F127, poly(oxypropylene), poly(oxyethylene), polyoxyethylated nonionic surfactants or chitosan. Nanoparticles may comprise particles ranging from 50 nm to 1000 nm in size and further comprising one or more of silicates, surfactants, lipids, proteins, albumin, sodium alginate, chitosan, poly lactide-co-glycolide, polylactic acid, polycaprolactone. Specifically, nanoparticle and micellular formulations are discussed in more detail below. The above formulations may be delivered to the ocular surface via a method comprising eye drops, nanowafers, contact lenses impregnated with nanoparticles, hydrogels or hydrogel-contact lenses.

The formulation set forth herein will be delivered by dropper, micro dropper, spray, piezoelectric collimated spray delivery devices or through the use of an accelerant into the eye. By way of example, the disclosure herein has an advantage of requiring a lower dosage of active ingredients compared to that of a standard dropper. This is demonstrated by the fact that a standard size eye drop is 40 µL and delivers drugs at 5% efficiency. Whereas the nanoparticle formulation herein has been unexpectedly found to deliver drugs at 80-100% efficiency thereby requiring as low as $\frac{1}{20}^{th}$ the active pharmaceutical ingredient concentration as that which is used in a standard eye drop (for example, a 6.25 µg/ml Brimonidine and 250 µg/mL pilocarpine standard formulation would instead only require 0.3125 µg/mL of Brimonidine and 12.5 µg/mL of pilocarpine).

The nanoparticle formulation of the present invention allows for increased dosage strength and reduction in the amount of brimonidine and pilocarpine administered to treat presbyopia. This is achieved though the retention and sustained release of these therapeutics at the mucosal surfaces of the eye. Further, protecting the drug inside of nanoparticles allows the drug to be effectively stored as a solid, increasing stability and shelf life. Taken together this formulation will allow for a reduction in cost via a decrease in the amount of product needed to create an effective dose and increased stability of the product allowing for a longer time before expiration. The sequestration of drugs inside of nanoparticles coated with similar exterior surfaces can also simplify the mixing of drugs that previously could not be easily combined into one formulation. The decrease in dosage number and ability to combine multiple drugs will also increase patient compliance with therapy since many patients dislike or struggle with self-administering medications to the eye.

Embodiments of the invention will use a formulation of a sustained release nano-particle carrier system with higher precorneal retention than conventional eye drops. These nano-particle carrier systems will improve the ocular bioavailability of the active drugs and provide higher patient compliance due to lower drug concentrations and less frequent administration to achieve the same clinical effect as higher dosage and more frequent administration of the same drug in traditional eyedrop forms. The advantages of nanoparticles with one or more active ingredients over traditional eye drops include enhancing drug permeability across the blood-aqueous barrier and cornea, prolonging drug contact time with ocular tissues, delivering drugs to specific tissue site in a controlled manner, protecting drugs from degradation and metabolism to enhance drug stability, sustaining drug release for 12 hours to days, having low to no toxicity and side effects due to decreased concentration of active drugs, maintaining long shelf life, and needing no reconstitution and no surgical removal The proposed formulation will be delivered by way of several nanoparticle formulations. An embodiment of this invention will be pharmaceutical formulation comprising a nanoparticle composition that provides controlled delivery of one or a combination of therapeutic agents comprising the agent or agents encapsulated in a matrix comprising chitosan, polyethylene glycol (PEG) and/or polyvinyl alcohol (PVA), and tetra-methoxy-ortho-silicate (TMOS) or tetra-ethoxy-ortho-silicate (TEOS). A further embodiment of this formulation will have a therapeutic agent selected from the group consisting of brimonidine or pilocarpine. A further embodiment of this formulation will have a therapeutic agent with a strength of about 5% compared to the strength of the same agent in an ophthalmic formulation that does not provide the controlled delivery of said therapeutic agent. A further embodiment of this formulation will have a therapeutic agent with composition containing polyethylene glycol having a molecular weight of 200 to 20,000 Daltons. A further embodiment of this formulation will contain a silane, wherein said silane optionally contains an alkyl side chain, a PEG having a molecular weight of 200 to 400 Daltons, a carbohydrate, an amino terminus, or a reactive sulfhydryl or carboxyl group. A further embodiment of this formulation will have a silane that is a hydrophobic silane. A further embodiment of this formulation will contain the combination of polyethylene glycol (PEG) and tetra-methoxy-ortho-silicate (TMOS). A further embodiment of this formulation will have a nanoparticles with a diameter of 10 nm to 1 μm. A further embodiment of this includes a method for the treatment of presbyopia comprising administering a therapeutically effective amount of the pharmaceutical formulation set forth above.

Certain embodiments of this invention may be prepared by (1) admixing the agent or agents with chitosan, polyethylene glycol (PEG) and/or polyvinyl alcohol (PVA), and tetra-methoxy-ortho-silicate (TMOS) or tetra-ethoxy-ortho-silicate (TEOS) in a buffered solution; (2) drying the mixture of step (1) to produce a gel; and (3) heating the gel to produce a glassy material, or lyophilizing the gel to produce a particulate material. The proposed method of preparing this embodiment may optionally contain a polyethylene glycol having a molecular weight of 200 to 20,000 Daltons. The proposed method preparing this embodiment may optionally include a step where the TMOS or TEOS is diluted with an additional silane. The proposed method preparing this embodiment may optionally include a step wherein the gel is heated in step (3) at a temperature of 70° C. or less than 70° C. The proposed method preparing this embodiment may optionally include a step which further comprises grinding or milling the material of step (3) to produce nanoparticles of a desired size. An additional embodiment of this invention comprises the nanoparticles having an average size of at least about 50 nm and less than or equal to about 400 μm.

Another embodiment of the present invention comprises one or more cationic lipids. In an aspect and without limitation, any pharmaceutically acceptable cationic lipid may be employed. Another embodiment of the present invention comprises a plurality of coated nanoparticles. For example, this embodiment includes a pharmaceutical formulation comprising a plurality of coated nanoparticles, wherein the coated nanoparticle comprises a core particle comprising a solid pharmaceutical agent or a salt thereof. Another embodiment of this pharmaceutical formulation will include an agent that is selected from the group consisting of brimonidine or pilocarpine. Another embodiment of this pharmaceutical formulation may include one or more of said agents. Another embodiment of this pharmaceutical formulation will include the agent or salt having an aqueous solubility of less than or equal to about 1 mg/ml at 25° C. at any point throughout the pH range. Another embodiment of this pharmaceutical formulation will have the pharmaceutical agent or salt thereof constituting at least about 80 wt % of the core particle and a polymer constitutes less than about 20 wt % of each of the core particles. Another embodiment of this pharmaceutical formulation will have a coating comprising a surface-altering agent surrounding the core particle. Another embodiment of this pharmaceutical formulation will have a surface-altering agent comprising a triblock copolymer comprising a hydrophilic block-hydrophobic block-hydrophilic block configuration. Another embodiment of this pharmaceutical formulation will include a hydrophobic block having a molecular weight of at least about 2 kDa, and the hydrophilic blocks constitute at least about 15 wt % of the triblock copolymer. A further embodiment of this includes a method for the treatment of presbyopia comprising administering a therapeutically effective amount of the pharmaceutical formulation set forth above.

An additional embodiment of the invention comprises delivering to an ophthalmic membrane a composition comprising a plurality of coated nanoparticles, wherein the coated nanoparticle comprises: a core particle comprising a solid pharmaceutical agent or a salt thereof, wherein the agent or salt has an aqueous solubility of less than or equal to about 1 mg/ml at 25° C. at any point throughout the pH range, wherein the pharmaceutical agent or salt thereof constitutes at least about 80 wt % of the core particle and a polymer constitutes less than about 20 wt % of each of the core particles; and a coating comprising a surface-altering agent surrounding the core particle, wherein the surface-altering agent comprises a triblock copolymer comprising a hydrophilic block-hydrophobic block-hydrophilic block configuration, wherein the hydrophobic block has a molecular weight of at least about 2 kDa, and the hydrophilic blocks constitute at least about 15 wt % of the triblock copolymer, wherein the hydrophobic block associates with the surface of the core particle, wherein the hydrophilic block is present at the surface of the coated particle and renders the coated particle hydrophilic, and wherein the surface-altering agent is present on the surface of the core particle at a density of at least about 0.001 molecules per nanometer squared.

A further embodiment of the invention comprises a method of forming coated nanoparticles, comprising combining core particles with a solution comprising a surface-altering agent, wherein the core particles comprise a solid pharmaceutical agent or a salt thereof, wherein the agent or salt has a solubility of less than or equal to about 1 mg/mL in the solution at 25° C., wherein the pharmaceutical agent or salt thereof constitutes at least about 80 wt % of each of the core particles and a polymer constitutes less than about 20 wt % of each of the particles; and coating the core particles with the surface-altering agent to form coated particles, wherein the surface-altering agent comprises a triblock copolymer comprising a hydrophilic block-hydrophobic block-hydrophilic block configuration, wherein the hydrophobic block has a molecular weight of at least about 2 kDa, and the hydrophilic blocks constitute at least about 15 wt % of the triblock copolymer, wherein the hydrophobic block associates with the surface of the core particles, wherein the hydrophilic block is present at the surface of the coated particles and renders the coated particles hydrophilic, and wherein the coated particles have a relative velocity of greater than 0.5 μm/s in mucus. An additional embodiment of this invention comprises the surface-altering agent being covalently attached to the core particles. An additional embodiment of this invention comprises wherein the surface-altering agent being non-covalently adsorbed to the core particles. An additional embodiment of this invention comprises the surface-altering agent being present on the surfaces of the coated particles at a density of at least about 0.001 molecules per nanometer squared. An additional embodiment of this invention comprises the hydrophilic blocks of the triblock copolymer constituting at least about 30 wt % of the triblock copolymer. An additional embodiment of this invention comprises the hydrophobic block portion of the triblock copolymer having a molecular weight of at least about 3 kDa. An additional embodiment of this invention comprises the triblock copolymer being poly(ethylene oxide)-poly(propylene oxide)-poly(ethylene oxide) or poly(ethylene glycol)-poly(propylene oxide)-poly(ethylene glycol). An additional embodiment of this invention comprises the hydrophilic block of the triblock copolymer comprises poly(ethylene oxide) or poly(ethylene glycol) or a derivative thereof. An additional embodiment of this invention comprises the poly(ethylene oxide) or poly(ethylene glycol) block having a molecular weight of at least about 2 kDa. An additional embodiment of this invention comprises the hydrophobic block of the triblock copolymer being poly(propylene oxide). An additional embodiment of this invention comprises the poly(propylene oxide) block having a molecular weight of, at least about 3 kDa. An additional embodiment of this invention comprises the surface-altering agent being present in a coating solution at a concentration of at least about 0.1% (w/v). An additional embodiment of this invention comprises the solid pharmaceutical agent being present in a crystalline form. An additional embodiment of this invention comprises the active pharmaceutical ingredient constituting at least about 85 wt % of the core particle. An additional embodiment of this invention comprises the core particle having an average size of at least about 20 nm and less than or equal to about 1 µm. An additional embodiment of this invention comprises the coated particles having an average size of at least about 20 nm and less than or equal to about 1 µm.

An embodiment of this invention includes a method of treating a subject comprising administering a therapeutic amount of the proposed nanoparticle ophthalmic formulation to the eye of a patient one or more times daily, which would be less than the frequency of administration of similar active pharmaceutical ingredients by way of a standard dropper. Another embodiment of this invention includes a method of treating a subject comprising administering a therapeutic amount of the proposed nanoparticle formulation to a patient which would be a lower strength than the active pharmaceutical ingredients that are administered by way of a standard dropper.

An additional embodiment of this invention includes a method of treating a subject comprising administering a therapeutic amount of the proposed cationic emulsion ophthalmic formulation to the eye of a patient one or more times daily, which would be less than the frequency of administration of similar active pharmaceutical ingredients by way of a standard dropper. Another embodiment of this invention includes a method of treating a subject comprising administering a therapeutic amount of the proposed cationic emulsion formulation to a patient which would be a lower strength than the active pharmaceutical ingredients that are administered by way of a standard dropper.

Additional embodiments of the invention will include combinations of the embodiment disclosed above used either separately or in a single formulation. For example, one embodiment may contain brimonidine as the active ingredient and the other formulation may contain pilocarpine as the active ingredient. Such embodiment may be manufactured separately and then administered to the patient separately or administered in a single formulation. Other embodiment will contain brimonidine and pilocarpine in a single formulation. In another embodiment Silica nanoparticles will be milled down such that the mean diameter is between 200 and 300 nm. D90=500 nm; D10=100 nm.

What is claimed is:

1. A pharmaceutical formulation comprising a cationic emulsion comprising a therapeutic agent,
    wherein said therapeutic agent consists of brimonidine and pilocarpine,
    wherein the cationic emulsion comprises nanoparticles encapsulating the therapeutic agent, and
    wherein the nanoparticles encapsulating the therapeutic agent comprise polyethylene glycol and tetra-methoxy-ortho-silicate,
    wherein each nanoparticle comprises a core particle and a coating surrounding the core particle, wherein the core particle comprises the therapeutic agent and a polymer, wherein the coating comprises a surface-altering agent,
    wherein the therapeutic agent constitutes at least about 80 wt % of the core particle, and the polymer constitutes less than about 20 wt % of the core particle, and wherein brimonidine is present in an amount of 0.005% to 0.05% wt/vol based on mass of brimonidine in the formulation, and pilocarpine is present in an amount of 0.1 to 6% wt/vol based on mass of pilocarpine in the formulation.

2. The pharmaceutical formulation of claim 1, wherein the nanoparticles have a diameter of 10 nm to 1 µm.

3. The pharmaceutical formulation of claim 1, wherein said therapeutic agent has an efficacy of about 5% compared to the strength of the same agent in an ophthalmic formulation that is not formulated as a cationic emulsion.

4. The pharmaceutical formulation of claim 1, wherein the pharmaceutical formulation is provided with a dropper for administering the pharmaceutical formulation to an eye of a subject.

5. The pharmaceutical formulation of claim 1, wherein the surface-altering agent comprises a triblock copolymer comprising a hydrophilic block-hydrophobic block-hydrophilic block configuration.

* * * * *